L. J. HILER.
SAW JOINTER AND SIDE DRESSING DEVICE.
APPLICATION FILED APR. 19, 1912.
1,064,732.
Patented June 17, 1913.
2 SHEETS—SHEET 2.
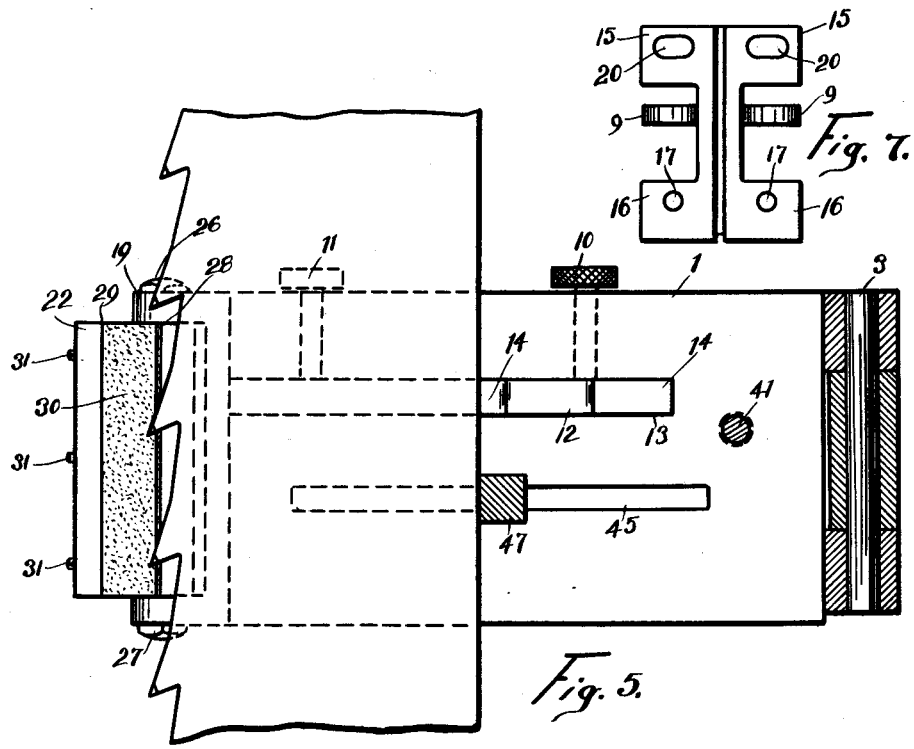
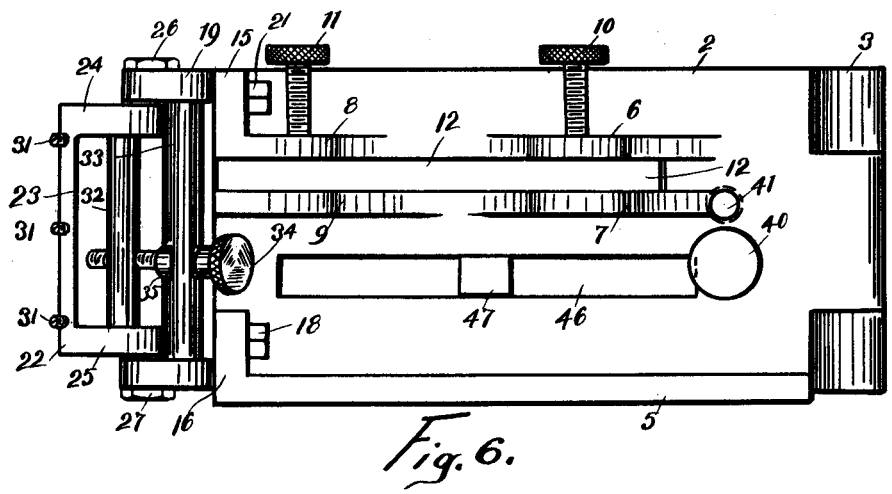

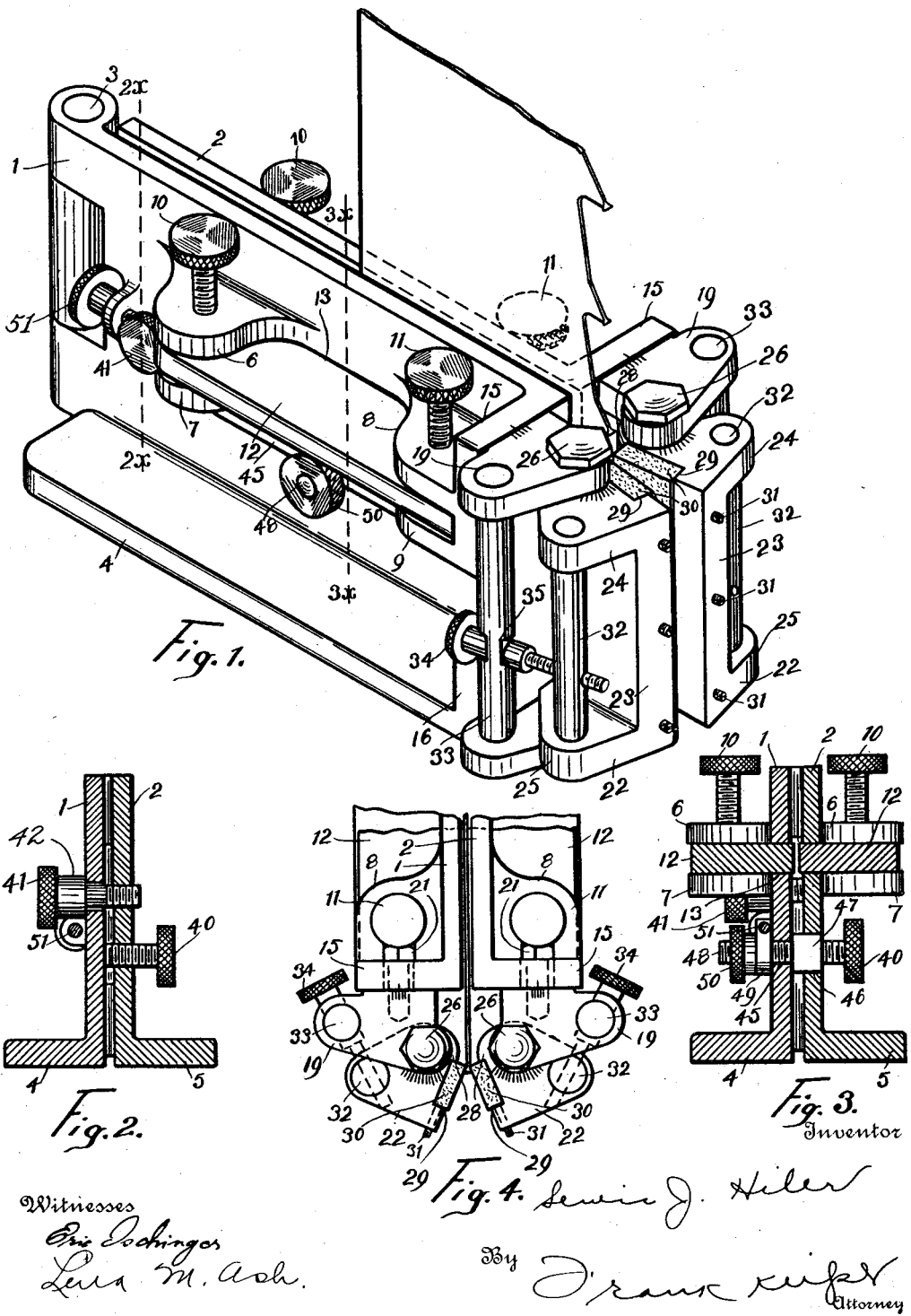

UNITED STATES PATENT OFFICE.

LEWIS J. HILER, OF ROCHESTER, NEW YORK.

SAW-JOINTER AND SIDE-DRESSING DEVICE.

1,064,732.     Specification of Letters Patent.     Patented June 17, 1913.

Application filed April 19, 1912. Serial No. 691,946.

*To all whom it may concern:*

Be it known that I, LEWIS J. HILER, a citizen of the United States, residing at Rochester, in the county of Monroe and State of New York, have invented certain new and useful Improvements in Saw-Jointers and Side-Dressing Devices, of which the following is a specification.

The object of this invention is to provide a tool or device for binding the sides of saw teeth.

Another object of my invention is to provide a device that can be applied to the teeth of a saw while in operation from the rear of the saw blade.

Another object of my invention is to provide a device with a back gage which will limit the depth to which the saw will enter the gage for the purpose of grinding the teeth, said gage being adjustably mounted in the device.

Another object of my invention is to provide adjustable guides on each side of the device between which the saw blade will be held to run true.

Another object of my invention is to provide grinding jaws on a device which are both pivotally and radially mounted to give any adjustment of angle with regard to the saw blade and any inclination or convergence with reference to the teeth.

Another object of my invention is to provide the device with various mechanical adjustments by which the device can be set in any adjustment through a great range of requirement and rigidly held in such adjustment.

These and other objects of my invention will be fully illustrated in the drawings and described in the specification and pointed out in the claims at the end thereof.

In the accompanying drawings, Figure 1 is a perspective view of my device shown in operative position with reference to the saw blade. Fig. 2 is a vertical section on the line $2^x$—$2^x$ of Fig. 1. Fig. 3 is a vertical section on the line $3^x$—$3^x$ of Fig. 1. Fig. 4 is a top plan view of the forward end of my device as shown in Fig. 1. Fig. 5 is a side elevation of the left hand side of my device as shown in Fig. 1, looking at it from the right of Fig. 1. Fig. 6 is a side elevation of the complete device as shown in Fig. 1, looking at it from the right of Fig. 1, the saw blade being omitted. Fig. 7 is an end elevation of the jaws of my device omitting the brackets and frames.

In the accompanying drawings, like reference numerals refer to like parts.

In the accompanying drawings, a frame work of my improved device is shown comprising two jaws 1 and 2, hinged at 3. Each of these jaws has a flange on the bottom thereof 4 and 5 as shown in the cross section in Figs. 2 and 3. Lugs 6, 7, 8 and 9 are provided on the jaw 1 in the upper ones of which are mounted the set screws 10 and 11 by which the wooden guide block 12 is clamped in place against the lugs 7 and 9. The jaw 1 is slotted at 13 permitting the wooden guide block 12 to extend thereto as is shown in Fig. 3. Similar lugs and clamping screws and a wooden guide block are also mounted on the jaw 2 as is shown in section in Fig. 3 and in side elevation in Fig. 6.

Each of the wooden guide blocks is provided with bearing faces 14, 14 which are intended to bear against the saw blade and hold it in correct position during its movement. On the front end of each of the jaws is provided the flange 15 and at the bottom, the flange 16. In the bottom flange 16 is provided the round opening 17 through which passes the stud 18. Pivotally mounted on the stud 18 is the bracket 19. The lug 15 is slotted as shown at 20 through which slot extends the stud 21 into a threaded engagement with the top of the bracket 19. It will be seen that the bracket 19 is thus mounted to swing around the stud 18, the center of which is fixed, the top being adjustable by reason of the slot 20 toward and away from the saw blade. If desired the opening 17 may be slotted so as to give it a like adjustment at the bottom.

Pivotally mounted on each of the brackets 19 are the frames 22, 22. This frame is preferably made up as a solid casting having the plate 23 thereon at the ends of which are the lugs 24 and 25. The lugs 24 and 25 are perforated to receive the studs 26 and 27 by which the frame 22 is pivotally mounted in each case on its bracket 19. Each of the frames 22 is provided with the flanges 28 and 29 between which the grinding stones 30 are clamped, set screws 31 being used for this purpose. Instead of the grinding stone, any suitable grinding device may be used, such as files or mills, etc.

Each of the frames 22 is provided with an adjusting bar 32 pivotally mounted therein. On each of the brackets 19 is mounted an adjusting bar 33 pivotally mounted therein. Passing through the bars 32 and 33 is provided the adjusting screw 34, which screw has a threaded engagement with the bar 32. The bar 33 is cut out at 35 with parallel flat bearing surfaces. The screw 34 is provided with a bearing surface or shoulder integral therewith for contacting with one of said bearing surfaces and on the other side is provided with a collar making a drive fit therewith, which contacts with the bearing surface on the other side of the bar 33 so that between these parts, the adjusting screw 34 is held against endwise movement. The threaded end of the screw 34 engages with the threaded opening in the bar 32. By turning the screw 34 the frame 22 is caused to swing around the studs 26 and 27, causing the grinding stone 30 to move radially toward or away from the teeth of the saw blade. The studs 21 can be released at the top permitting the brackets 19 to be swung in or out at the top, thus making the grinding stones lie parallel to the saw blade or converge to or diverge from the saw blade at the bottom.

A zero mark is placed on top of each of the lugs 15 and a measuring scale is placed on top of each of the brackets 19 by which the degree of divergence or convergence can be properly measured.

An angular scale is placed on top of each of the lugs 24 of the frame 22 concentric with the studs 26 and a zero mark is placed on the face of the bracket 19 adjacent thereto by which the angular adjustment of the frames 22 can be measured.

On the jaw 2 is mounted an adjusting screw 40 which has a threaded engagement with the jaw 2 and which bears against the jaw 1 by which the jaws may be forced apart. Mounted on the jaw 1 is the adjusting screw 41 having the shoulder 42 thereon which bears against the side of the jaw 1 and which has a threaded end which makes a threaded engagement with the jaw 2. By the adjusting screw 41, the parts may be drawn together and locked when they have reached their proper relative position.

In Fig. 3, I have shown a sectional elevation of my back gage. To provide for this each of the jaws 1 and 2 is slotted lengthwise as shown at 45 and 46. The gage 47 is provided with a shouldered end bearing against the jaw 1. The gage extends into the slot 46 of the jaw 2 which slot is made broader than the slot 45 on the jaw 1 on that account. The gage 47 has a reduced end 48 which is threaded and which extends through the slot 45 on the jaw 1. On this threaded end is provided the washer 49 and nut 50. By means of the nut 50 the gage may be clamped in any desired place.

To secure minute adjustment of the gage, the adjusting screw 51 is provided which passes through the washer 49.

In the operation or use of my device the device will be placed on the table or carriage of the sawing machine back of the saw and with the opening in the device in line with the saw blade, with the back gage clamped in such position that the back of the saw blade will contact with it when the grinding devices are making contact with the teeth. It will be seen that the grinding devices approach the teeth from the rear and will usually be placed so that their grinding or cutting action will be limited to the sides and back of the teeth and will not occur on the cutting edges although the grinding devices may be shifted so as to cut the front as well as the sides if desired. The teeth on which the device is intended to grind or cut are swaged or broadened out at the tips or horizontal cutting edges, the edges being backed up by steep bevels or inclines that taper quickly to the thickness of the saw blade. The object of this device is to grind or shape the sides of the teeth so that they will project evenly on both sides from the saw blade which will cause the saw to leave a smooth even surface on the lumber cut. With the teeth so ground the saw will run true in the wood that it is cutting, and if the teeth are not cut evenly the saw will tend to drift to the one side or the other and will leave the freshly cut surface of the lumber rough or full of scratches.

I claim—

1. In a device for side dressing saws, the combination of a pair of pivoted jaws, a bracket pivotally mounted on the forward end of each of said jaws, a frame pivotally mounted on each of said brackets, a grinding device carried on each of said frames.

2. In a device for side dressing saws, the combination of a pair of pivoted jaws, a bracket pivotally mounted on the forward end of each of said jaws, a frame pivotally mounted on each of said brackets, a grinding device carried on each of said frames, said frame being mounted to swing transversely to the swing of the bracket.

3. In a device for side dressing saws, the combination of a pair of pivoted jaws, a bracket pivotally mounted on the forward end of each of said jaws, a frame pivotally mounted on each of said brackets, a grinding device carried on each of said frames, said frame being mounted to swing transversely to the swing of the bracket, a back gage adjustably mounted on one of said jaws and extending between them, said gage being movable along the jaws, means for clamping said gage in any position.

4. In a device for side dressing saws, the combination of a pair of pivoted jaws, grinding devices pivotally mounted on said jaws to rotate in two planes.

5. In a device for side dressing saws, the combination of a pair of pivoted jaws, grinding devices pivotally mounted on said jaws to rotate in two planes, the opening between said jaws being adapted to receive the whole width and thickness of the saw blade.

6. In a device for side dressing saws, the combination of a pair of pivoted jaws, grinding devices pivotally mounted on said jaws to rotate in two planes, the opening between said jaws being adapted to receive the whole width and thickness of the saw blade, a back gage between said jaws to fix the position of said saw blade in said jaws.

7. In a device for side dressing saws, the combination of a pair of pivoted jaws, a grinding device on each of said jaws, each of said grinding devices being adjustable angularly in two planes independently of its jaw.

8. In a device for side dressing saws, the combination of a jaw, a flange thereon having a slot at the top thereof, a bracket pivotally mounted on said flange, said pivoted mounting including a stud at the bottom of the bracket engaging with the flange and a screw passing through the slot at the top of the flange and engaging with the bracket.

9. In a device for side dressing saws, the combination of a jaw, a bracket pivotally mounted thereon, a frame pivotally mounted on said bracket, a bar on said frame, a bar on said bracket, lugs on said frame and said bracket in which said bars are mounted, a screw mounted to rotate in one of said bars and held against longitudinal movement therein, said screw having threaded engagement with the other bar whereby an angular adjustment may be given said frame on said bracket.

10. In a device for side dressing saws, the combination of a pair of pivoted jaws, each having vertical flanges on the forward end thereof, a bracket mounted on each of said flanges adapted to swing in a vertical plane thereon, a frame mounted on each bracket and adapted to swing in a horizontal plane thereon.

11. In a device for side dressing saws, the combination of a pair of pivoted jaws, each having vertical flanges on the forward end thereof, a bracket mounted on each of said flanges adapted to swing in a vertical plane thereon, a frame mounted on each bracket and adapted to swing in a horizontal plane thereon, means for fastening the brackets and the frames in any angular position.

12. In a device for side dressing saws, the combination of a pair of pivoted jaws, flanges on the bottom of each jaw, said flanges extending oppositely and forming a base for the support of said device, a back gage closing the opening between said jaws at the rear, grinding devices carried on said jaws at the front, a saw blade adapted to run through said grinding devices with the back of said blade against the back gage and the sides of the teeth against said grinding devices.

13. In a device for side dressing saws, the combination of a pair of pivoted jaws, a back gage closing the opening between said jaws at the rear, said back gage being supported by and being adjustable along and clamped to the side of one of said jaws, grinding devices carried on said jaws at the front, a saw blade adapted to run through said grinding devices with the back of said blade against the back gage and the sides of the teeth against said grinding devices, said grinding devices being converged and adapted to bear against the sides and backs of the teeth.

14. In a device for side dressing saws, the combination of a pair of jaws, lugs arranged on each of said jaws in rows, a slot between each of said rows of lugs, a bearing block in said slot and supported upon the lugs of one of said rows, set screws in the lugs of the other row, bearing against said block and holding it in position between the lugs.

15. In a device for side dressing saws, the combination of a pair of jaws, lugs arranged on each of said jaws in rows, a slot between each of said rows of lugs, a bearing block in said slot and supported upon the lugs of one of said rows, set screws in the lugs of the other row, bearing against said block and holding it in position between the lugs, said bearing blocks projecting toward each other and forming a guide for the saw blade.

16. In a device for side dressing saws, the combination of a pair of pivoted jaws, a back gage closing the opening between said jaws at the rear, a screw having a threaded engagement with said back gage for adjusting said gage longitudinally along the jaw, means for clamping said gage to one of the jaws in its adjusted position.

In testimony whereof I affix my signature in presence of two witnesses.

LEWIS J. HILER.

Witnesses:
 CHESTER B. FOSTER,
 ERIC ISCHINGER.

Copies of this patent may be obtained for five cents each, by addressing the "Commissioner of Patents Washington, D. C."